United States Patent [19]
Marumoto et al.

[11] Patent Number: 4,869,334
[45] Date of Patent: Sep. 26, 1989

[54] ELECTRIC MOTOR-DRIVEN POWER STEERING APPARATUS

[75] Inventors: Katsuji Marumoto; Tsutomu Ohmae; Toshiyuki Koterazawa; Kazuaki Tobari, all of Hitachi, Japan

[73] Assignee: Hitachi, Ltd., Tokyo, Japan

[21] Appl. No.: 181,048

[22] Filed: Apr. 13, 1988

[30] Foreign Application Priority Data

Apr. 13, 1987 [JP] Japan .................................. 62-88821

[51] Int. Cl.⁴ ........................... B62D 5/04; B62D 5/30
[52] U.S. Cl. ................................ 180/79.1; 364/424.05
[58] Field of Search ................. 180/79.1, 133, 79; 364/424.01, 424.05; 371/9

[56] References Cited

U.S. PATENT DOCUMENTS 4,724,917  2/1988  Naito et al. ..................... 180/133 X

FOREIGN PATENT DOCUMENTS

| | | | |
|---|---|---|---|
| 120572 | 7/1984 | Japan ................................ | 180/133 |
| 8760900 | 11/1987 | PCT Int'l Appl. ................. | 180/133 |
| 8804250 | 6/1988 | PCT Int'l Appl. ................. | 180/79.1 |
| 2138175 | 10/1984 | United Kingdom ........... | 364/424.01 |
| 2196913 | 5/1985 | United Kingdom ............... | 180/79.1 |

Primary Examiner—Mitchell J. Hill
Attorney, Agent, or Firm—Antonelli, Terry & Wands

[57] ABSTRACT

The steering power assist control comprises a main assist control and an auxiliary assist control. When an abnormality occurrence signal from the main assist control is inputted to an abnormality state detection and changing decision circuit 134, the selector circuit changes the PWM signal from the main assist control side to the auxiliary assist control side and outputs the PWM signal to a motor drive circuit. When the main assist control fails, the auxiliary assist control immediately takes over the main assist control to provide, if the operation condition permits, a continued steering power assist control. This prevents an abnormal steering state of the vehicle that would otherwise result when the steering power assist is suddenly lost.

17 Claims, 7 Drawing Sheets

ELECTRIC MOTOR-DRIVEN POWER STEERING APPARATUS

BACKGROUND OF THE INVENTION

1. Field of the Invention

The present invention relates to an electric motor-driven power steering apparatus and, more particularly to an electric motor-driven power steering apparatus suitably applicable to a vehicle steering apparatus such as an automobile steering apparatus, a battery type fork lift steering apparatus etc..

The electric motor-driven power steering control apparatus includes a steering power assist control means which controls a steering power assist for a steering wheel by use of a motor. The steering power assist control means of the present invention comprises a main steering power assist control means and an auxiliary steering power assist control means.

2. Prior Art

A conventional electric motor-driven power steering apparatus in, for example in U.S. Pat. No. 4,614,248, includes a steering power assist control means. The steering power assist control means comprises only single steering power assist control means.

The conventional electric motor-driven power steering apparatus produces an assist power for the steering operation by energizing a motor through the single steering power assist control means and a motor drive means according to a steering torque input signal such as a torsional torque input signal.

The above stated conventional electric motor-driven power steering apparatus does not provide a protect means to protect against a failure of the single steering power assist control means.

Namely, when the single steering power assist control means of the conventional electric motor-driven power steering apparatus fails while the steering wheel is being turned and the steering power assist is being generated by the motor, the steering power assist will suddenly change, producing an unexpected steering state for the driver. This is very dangerous.

Especially when the automobile is cornering at a high speed, a sudden loss of the steering power assist will make the steering wheel heavy instantly, with a possibility of the automobile running out of control. Also, when the single steering power assist control means fails and an automobile which was running in a straight line is going to make a turn, the driver may not be able to cope with the unexpected situation.

SUMMARY OF THE INVENTION

An object of the present invention is to provide an electric motor-driven power steering apparatus wherein a continued supply of steering power assist by a motor can be assured even when a steering power assist control means fails.

Another object of the present invention is to provide an electric motor-driven power steering apparatus wherein when a main steering power assist control means fails, the steering power assist can be changed from the main steering power assist control means side to an auxiliary steering power assist control means side.

A further object of the present invention is to provide an electric motor-driven power steering apparatus wherein a sudden loss of steering power assist can be prevented.

In accordance with the present invention, in an electric motor-driven power steering apparatus comprising a steering wheel, a reduction mechanism, a steering mechanism, a motor for generating a steering power assist, a clutch disengaging mechanisms for disconnecting the motor from the reduction mechanism, a steering power assist control means for controlling an assist power for steering, and a motor drive means, in which the motor is controlled according to a torsional torque signal of the steering wheel or a steering angle signal of the steering wheel to provide assist power for steering.

A steering power assist control means of the electric motor-driven power steering apparatus comprises a first steering power assist control means and a second steering power assist control means.

A steering power assist change means is connected between the first steering power assist control means and the second steering power assist control means, when the first steering power assist control means fails while the steering assist power is being supplied, the steering power assist change means changes the steering power assist from the first steering power assist control means side to the second steering power assist control means side and continues steering assist power control.

A changing decision means is connected to the first steering power assist control means, when the first steering power assist control means is operating abnormally, the changing decision means produces a signal for changing the steering assist power control from the first steering power assist control means side to the second steering power assist control means side.

An abnormality state detection means is connected to the main steering power assist control means and detects a state of the first steering power assist control means and a steering state of a vehicle.

A selector means is connected to the changing decision means and is operated by the changing decision means in such a way that the motor drive means is controlled by the second steering power assist control means when the first steering power assist control means fails.

A clutch disengaging mechanism drive means is connected to the selector means and operates a clutch disengaging mechanism to disconnect the driving power of the motor when the steering wheel is not being turned and the steering power assist is zero.

The above stated objective can be achieved by a duplex steering power assist control means comprising the main steering power assist control means and the auxiliary steering power assist control means, when the main steering power assist control means fails the steering assist power is being applied, the steering power assist is changed from the main steering power assist control means side to the auxiliary steering power assist control means side.

In the above duplex steering power assist control means, in accordance with the present invention, the changing of control or transfer of control from the main steering power assist control means side to the auxiliary steering power assist control means side is performed as a result of a signal from the abnormality detection means that detects the state of the main steering power assist control means and the steering state of the vehicle through the changing decision means. At the same time the duplex steering power assist control means disconnects the motor through the clutch disengaging mechanism by the selector means.

The steering power assist control means of the present invention enables stable steering even when the main steering power assist control means malfunctions because the steering assist power is changed from the main steering power assist control means side to the auxiliary steering power assist control means side to prevent a sudden loss of the steering power assist which would otherwise occur in such a case.

For improved safety the steering power assist control means has another means in which the motor is finally disconnected from the reduction mechanism by the clutch disengaging mechanism to render the steering manually operable when elimination of steering power assist no longer affects the safe steering.

According to the present invention, when the first steering power assist control means of the electric motordriven power steering apparatus fails, the second steering power assist control means immediately takes over to provide, if the operation condition permits, a continued steering power assist control. This prevents an abnormal steering state of the vehicle that would otherwise result when steering power assist is suddenly lost.

DESCRIPTION OF THE INVENTION

One embodiment of the present invention will now be explained in following by referring to FIGS. 1 through 7 FIGS. 1 and 2 show one embodiment in which the present invention is applied to an automotive electric motordriven power steering apparatus.

Figure 2:
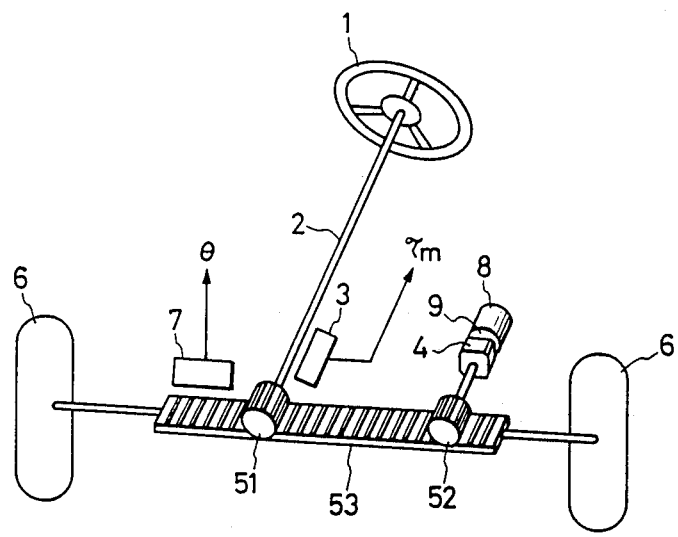
FIG. 2 is an outline view of the electric motordriven power steering apparatus according to one embodiment of the present invention.

The automotive electric motor-driven power steering apparatus includes a steering wheel 1, a steering shaft 2, a torque sensor 3 to detect a torsional torque of the steering wheel 1, a reduction mechanism 4, a steering mechanism 5 to drive tires 6, a steering angle sensor 7 to detect the amount of turn of the tire 6, a motor 8 for generating the steering power assist, and a clutch disengaging mechanism 9 for disconnecting the motor 8 from the reduction mechanism 4. The steering mechanism 5 includes a first a pinion gear 51, a rack gear 52, and a second pinion gear 53 as shown in FIG. 2.

The automotive electric motor-driven power steering apparatus includes further a motor drive circuit 10, a battery 11 for power supply to drive the motor 8, a motor current detector 12 for detecting a motor current signal Im, and a steering power assist control means 13. The steering power assist control means 13 comprises a main steering power assist control means (main controller) 131 and an auxiliary steering power assist control means (auxiliary controller) 132.

The automotive electric motor-driven power steering apparatus includes a selector circuit 133 for changing from the main steering power assist control means (a first steering power assist control means) 131 side is auxiliary steering power assist control means (a second steering power assist control means) 132 side, a circuit 134 for detecting the abnormal state of the main steering power assist control means 131 and for making a decision changing control from the main steering power assist control means 131 side the auxiliary steering power assist control means 132 side, a clutch disengaging mechanism drive circuit 135, and an abnormal state display circuit 136 for the main steering power assist control means 131.

The abnormality state detection and changing decision circuit 134 comprises an abnormality state detection circuit 134a for detecting the abnormal state of the main steering power assist control means 131 and a changing decision circuit 134b for making a decision changing control from the main steering power assist control means 131 side the auxiliary steering power assist control means 132 side.

The torque sensor 3 comprises a first torque sensor 3a and a second torque sensor 3b, this forming a dual sensor system. The steering angle sensor 7 comprises a first steering angle sensor 7a and a second steering angle sensor 7b, thus forming a dual sensor system.

The automotive electric motor-driven power steering apparatus includes further a vehicle speed sensor 14, a battery voltage sensor 15, and a temperature sensor 16 attached to the motor drive circuit 10.

The operation of the automotive electric motor-driven power steering apparatus shown in FIG. 1 according to the above embodiment of the present invention will be explained. The steering power assist applied by the driver to the steering wheel 1 is transmitted to the steering shaft 2, the reduction mechanism 4 and the steering mechanism 5 which drives the tires 6 by a specified angle.

The torque sensor 3 detects a torsional torque applied to the reduction mechanism 4 through the steering shaft 2 when the driver turns the steering wheel 1. The torque sensor 3 generates an electric signal $\tau m$ which is proportional to the magnitude of the torsional torque of the steering wheel 1 and supplies it to the main steering power assist control means 131 and also to the auxiliary steering power assist control means 132. The torque sensor 3 has two torque sensors 3a and 3b for increased reliability.

The steering power assist control means 13 performs control operations based on the torsional torque signal $\tau m$ outputted from the torque sensor 3. The main steering power assist control means 131 receives at least the torsional torque signal $\tau m$ to control the steering power assist and outputs a motor current command signal Imc, the motor current command signal Imc has a prescribed relationship with the torsional torque signal $\tau m$.

Namely, the main steering power assist control means 131 performs a current control calculation from a motor current command signal Imc and from a motor current detection signal Imf as a feedback signal.

The motor current command signal Imc has a prescribed relationship with the torsional torque signal τm. The motor current detection signal Imf is detected and outputted by the motor current detector 12.

According to the result of the current control calculation, the main steering power assist control means 131 subjects the motor drive circuit 10 through a selector circuit 133 to chopping operation to supply current from the power supply battery 11 to the motor 8 to turn it.

In this way, based on the torsional torque signal τm the motor 8 is rotated in the same direction as the steering wheel 1 turning direction and the rotation of the motor 8 is transmitted to the clutch disengaging mechanism 9, the reduction mechanism 4 and the steering mechanism 5 that produces a steering assist power to help change the direction of the tires 6.

The steering angle sensor 7 detects the steering angle θ and feeds it back to the main steering power assist control means 131. The steering angle sensor 7 has two sensors 7a and 7b for improved reliability.

Other signals supplied to the main steering power assist control means 131 includes those from the vehicle speed sensor 14, the battery voltage sensor 15, and the temperature sensor 16 attached to the motor drive circuit 10, all these being used for driving the automotive electric motor-driven power steering apparatus.

The auxiliary steering power assist control means 132 receives at least the torsional torque signal τm to control the steering assist power and outputs the motor current command signal Imc. The motor current command signal Imc has a prescribed relationship with the torsional torque signal τm.

The auxiliary steering power assist control means 132 performs a current control calculation from the motor current command signal Imc and from the motor current detection signal Imf as a feedback signal.

According to the result of the current control calculation, the auxiliary steering power assist control means 132 subjects the motor drive circuit 10 through the selector circuit 133 to a chopping operation to supply current from the power supply battery 11 to the motor 8 to turn it.

The rotation of the motor 8 is transmitted to the clutch disengaging mechanism 9, the reduction mechanism 4 and the steering mechanism 5 that produces a steering power assist to help change the direction of the tires 6. The steering angle sensor 7 detects the steering angle and feeds it back to the auxiliary steering power assist control means 132.

The auxiliary steering power assist control means 132 receives at least the torsional torque signal τm to perform the current control for the auxiliary steering power assist control means 132.

While the current control command signal Imc is to be based on the torsional torque signal τm from the steering wheel 1, it may be based on the steering angle θ of the steering wheel 1.

Next, the changing of control from the main steering power assist control means 131 side to the auxiliary steering power assist control means 132 side when the main steering power assist control means 131 malfunctions will be explained.

Under normal states operation of the main steering power assist control means 131, according to the torsional torque signal τm outputted from the torque sensor 3, performs the current control calculation to produce a pulse-width-modulated (PWM) signal or a pulse.

Similarly, the auxiliary steering power assist control means 132 also outputs a PWM signal or a pulse. The selector circuit 133 chooses the PWM pulse from the main steering power assist control means 131 and changes it to the motor drive circuit 10. The abnormality state detection and changing decision circuit 134 continuously checks the operation of the main steering power assist control means 131 for any abnormality.

When an abnormality occurrence signal from the main steering power assist control means 131 is inputted to the abnormality state detection and changing decision circuit 134, the selector circuit 133 changes the PWM signal or the pulse output from the main steering power assist control means 131 side to the auxiliary steering power assist control means 132 side and outputs the PWM signal or the pulse to the motor drive circuit 10.

The abnormality state detection and changing decision circuit 134 also outputs also a signal to the abnormality display circuit 136 for displaying an indication of the abnormality. Depending on the kind of abnormal state of the main steering power assist control means 131 and the steering state, the abnormality state detection and changing decision circuit 134 operates the clutch disengaging mechanisms 9 through the clutch disengaging mechanism drive circuit 135 to disengage the motor 8 from the reduction mechanism 4 and thereby prevent adverse effects of any abnormal operation of the motor 8 on the reduction mechanism 4.

The processing performed after the changing of control from the main steering power assist control means 131 side to the auxiliary steering power assist control means 132 side is shown in Table 1.

TABLE 1

| State | | Processing contents of processing done | | Display |
|---|---|---|---|---|
| | | 1st stage | 2nd stage | |
| No steering | When automobile is running straight (Torque output becomes zero) | Clutch disengaging mechanism is activated | Clutch disengaging mechanism is activated | Abnormal |
| Steering | When steering wheel is being turned (Torque exists) | Control is changed to auxiliary steering power assist control means to produce steering power assist | When wheel steering is stopped and motor current becomes zero, clutch disengaging mechanism is activated | Abnormal |
| | When automobile is turning (Torque exists) | | Steering power assist is gradually lowered. Clutch disengaging mechanism is activated | |

There are roughly two kinds of automobile running states under which the main steering power assist control means 131 may fail. First, the automobile is running in a straight line with the steering wheel 1 not turned and with no steering power by the driver applied when the main steering power assist control means 131 fails.

Second, the main steering power assist control means 131 may fail when the steering wheel 1 is being turned and the steering power is being applied by the driver.

In the case where no steering power assist is being exerted, the clutch disengaging mechanism 9 is immediately activated and the occurrence of an notification of abnormal state in the main steering power assist control means 131 is supplied to the driver through the display made by the abnormality display circuit 136.

The next case to be considered is the case where the main steering power assist control means 131 fails when steering power by the driver is being applied and the steering wheel 1 is being turned. As a first step, the PWM signal is changed from the main steering power assist control means 131 to the auxiliary steering power assist control means 132 to permit the motor 8 to continue producing the steering power assist.

Then as the second step, when the driver stops steering the steering wheel 1 and the motor current detection signal $IM_f$ of the motor 8 that produces the steering power assist becomes zero, the clutch disengaging mechanism 9 is activated to interrupt the change of the steering power assist of the motor 8 and the abnormality display circuit 136 displays the abnormal state of the main steering power assist control means 131.

When the steering power assist is being applied but the steering wheel 1 is held at a certain position while the automobile is making a turn, the steering power assist of the motor 8 is gradually lowered until finally the clutch disengaging mechanism 9 is operated and the abnormality is displayed by the abnormality display circuit 136.

Therefore, when the main steering power assist control means 131 fails, the steering power assist of the motor 8 is not lost abruptly, preventing a shock to the driver's steering wheel 1, which in turn contributes to improved safety automobile operation.

Figure 1:
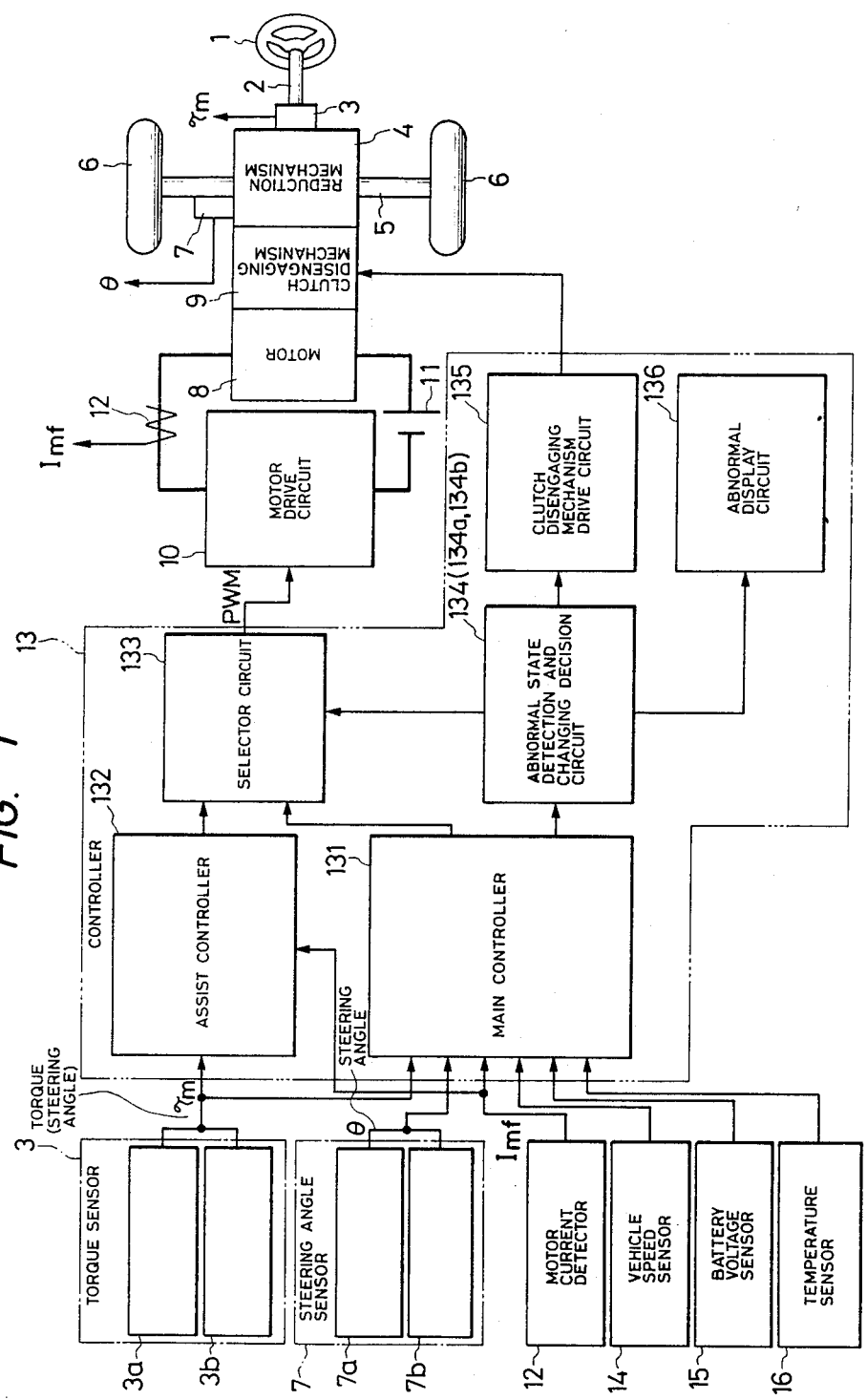
FIG. 1 is a block diagram of an electric motor-driven power steering apparatus according to one embodiment of the present invention.

A duplex steering power assist control means is provided in this embodiment of the present invention, so that the main steering power assist control means 131 and the auxiliary steering power assist control means 132 are parallelly arranged is parallel as shown in FIG. 1.

Next, an explanation will be given of the detail of one embodiment of the present invention of the steering power assist control means 13 comprising the main steering power assist control means 131 and the auxiliary steering power assist control means 132 shown in FIG. 1.

The following four configurations are possible for the main steering power assist control means 131 and the auxiliary steering power assist control means 132. (1) Both the main steering power assist control means and the auxiliary steering power assist control means are of microcomputer type, respectively; (2) the main steering power assist control means is of microcomputer type and the auxiliary steering power assist control means is of analog type, respectively; (3) the main steering power assist control means is of analog type and the auxiliary steering power assist control means is of microcomputer type, respectively; and (4) both the main steering power assist control means and the auxiliary steering power assist control means are of analog type, respectively.

Figure 3:
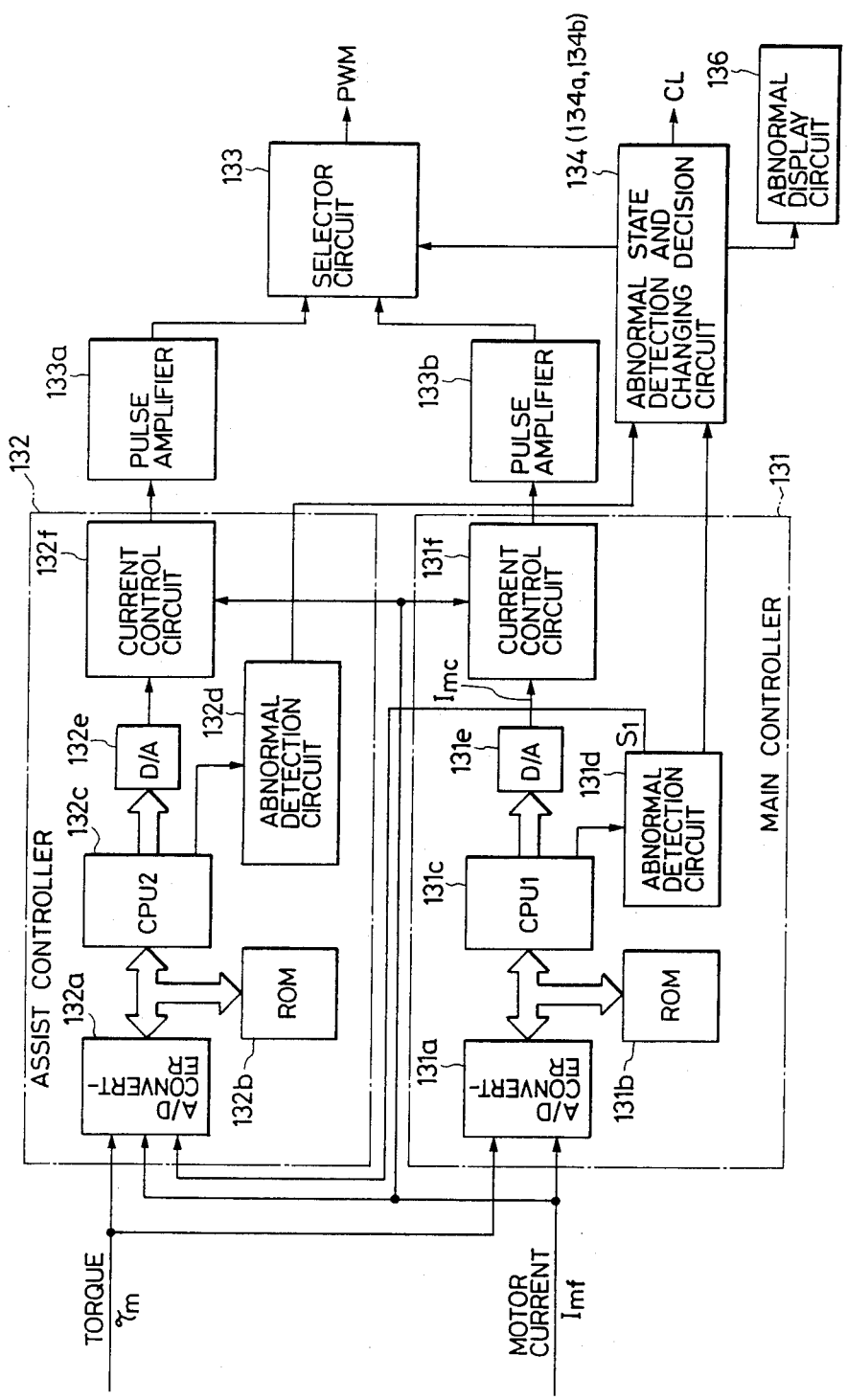
FIG. 3 is a detailed block diagram of a steering power assist control means according to one embodiment of the present invention.

One embodiment of the above case (1) is shown in FIG. 3 in which both the main steering power assist control means and the auxiliary steering power assist control means are of microcomputer type. In this figure, denoted 131 is a main steering power assist control means and 132 an auxiliary steering power assist control means, 131a and 132a A/D converters, 131b and 132b memories (ROM) in which a program is stored respectively, 131c and 132c microprocessors (CPU1, CPU2), 131e and 132e D/A converters, 131f and 132f current control circuits, 131d and 132d microprocessor detection circuits having the microcomputer function, and 133a and 133b pulse amplifiers.

Figure 4:
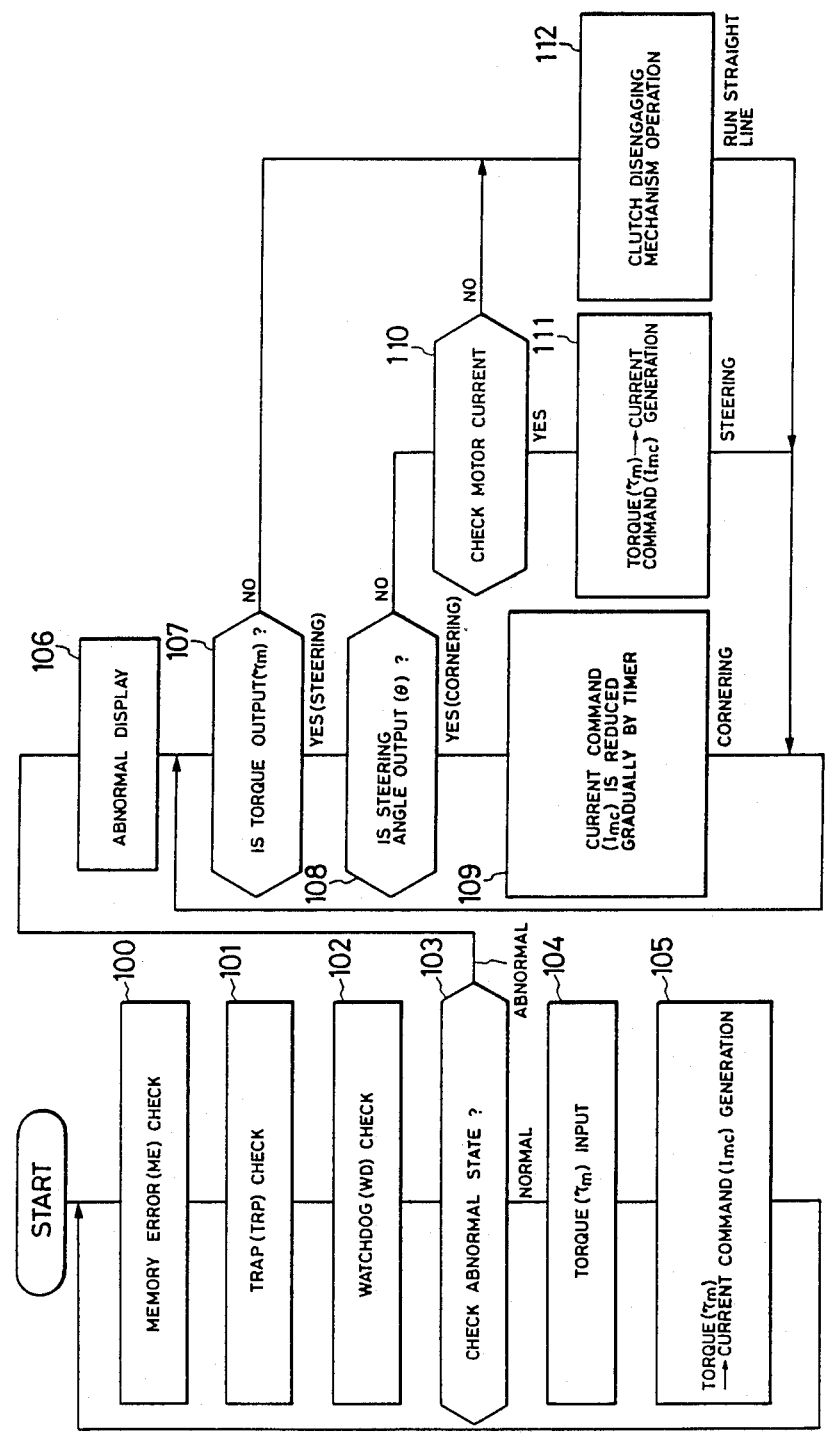
FIG. 4 is a flow-chart of a program according to one embodiment of the present invention.

One example of the program for the main steering power assist control means 131 and for the auxiliary steering power assist control means 132 is shown in FIG. 4. The program processing sequence is as follows. As the program starts, the steps 100 to 102 perform a memory error (ME) signal check, a trap (TRP) signal check and a watchdog (WD) signal check to see if the microprocessors are operating normally and the results of these checks are examined at the step 103. If normal, the step 104 receives the torsional torque signal $\tau m$ from the A/D converter 131a of FIG. 3.

At the step 105 the main steering power assist control means 131 produces the motor current command signal Imc corresponding to the torsional torque signal $\tau m$ and outputs the motor current command signal Imc through the D/A converter 131e. Then the program returns to the first step 100 and repeats the above sequence.

The current control circuit 131f of the main steering power assist control means 131 shown in FIG. 3 receives an output of the D/A converter 131e as the motor current command signal Imc, receives the motor current signal Im for the motor current detection signal Imf as a feedback signal, and performs a current control so that the motor current detection signal Imf equals the motor current command signal Imc. Then, the current control circuit 131f outputs the PWM signal through the pulse amplifier 133b and the selector circuit 133.

Now, returning to FIG. 4, when the microprocessor condition check at the step 103 detects any abnormality, the microprocessor abnormality detection circuit 131d of FIG. 3 generates a changing signal S1 from the main steering power assist control means 131 side to the auxiliary steering power assist control means 132 side and sends the changing signal S1 to the A/D converter 132a of the auxiliary steering power assist control means 132.

Figure 5:
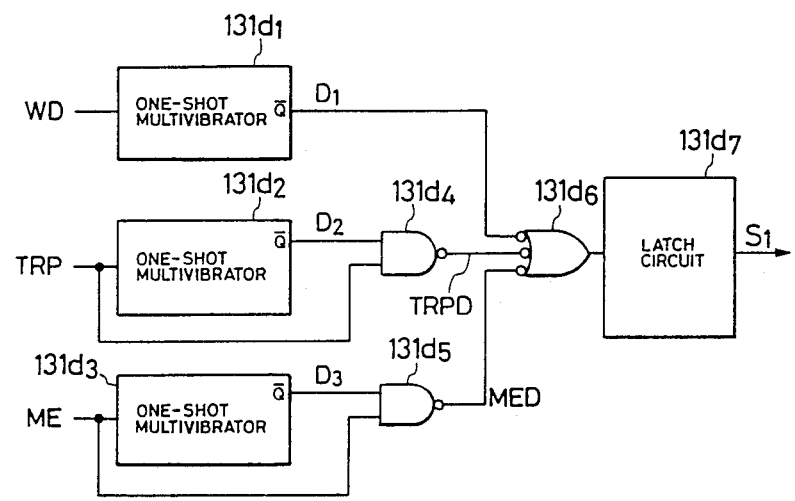
FIG. 5 is an electric circuitry of a microprocessor abnormality detection circuit according to one embodiment of the present invention.

The detail of the microprocessor abnormality detection circuit 131d is shown in FIG. 5. In this figure, reference numerals 131d1 to 131d3 represent one-shot multivibrators that produce signals Td1 to Td3 for a prescribed period. 131d4 and 131d5 stand for NAND gates, 131d6 for a NOR gate, 131d7 for a latch circuit. The operation time-chart for the microprocessor abnormality detection circuit 131d of FIG. 5 is shown in FIG. 6.

Figure 6:
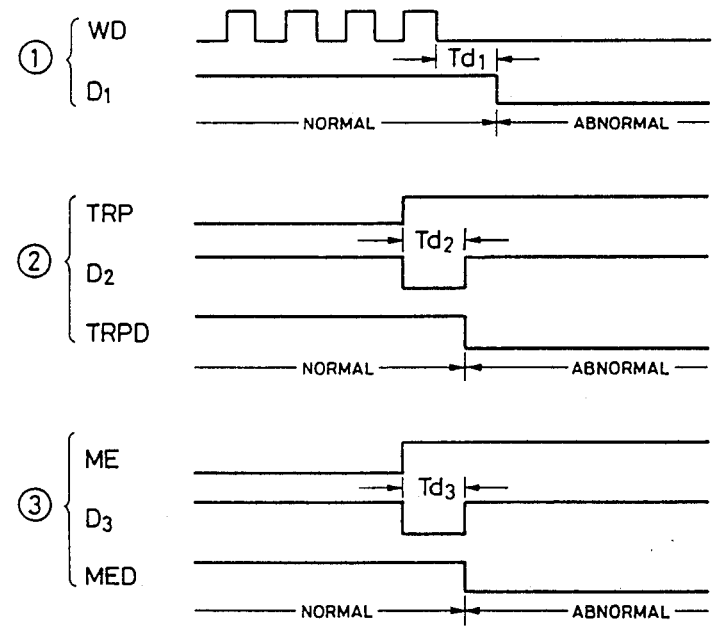
FIG. 6 is an operation time-chart of an electric circuitry of the microprocessor abnormality detection circuit according to one embodiment of the present invention.

The watchdog (WD) timer signal is inputted to the one-shot multivibrator 131d1 and, as shown in FIG. 6, when the watchdog (WD) timer signal that has been normally inputted fails for more than a prescribed duration Td1, the one-shot multivibrator 131d1 changes its D1 signal to low and the NOR gate circuit 131d6 produces an output causing the latch circuit 131d7 to generate the changing signal S1 which is supplied to the auxiliary steering power assist control means 132.

Similarly, when the trap (TRP) signal or the memory error (ME) signal is generated, an abnormality occurrence signal is generated with a delay time of Td2 or Td3 which is used to prevent erroneous operation due to noise. And the abnormality occurrence signal causes the latch circuit 131d7 to produce the changing signal S1.

In FIG. 3, upon receiving the changing signal S1 input through the A/D converter 132a, the auxiliary steering power assist control means 132 takes over the main steering power assist control means 131 without interruption in the steering power assist control operation by executing the following steps of the program.

Namely, in FIG. 4, the step 106 displays the abnormality display. The step 107 checks whether the torsional torque signal τm output is present. If not, the next step 108 checks whether the steering angle θ output is present.

Whether the automobile is making a turn can be determined by checking the steering angle θ or measuring the actual steered angle. When the automobile is making a turn, the step 109 gradually reduces the motor current command signal Imc by the use of a timer.

Next, the program returns to the step 107 to check if the torsional torque signal τm output is present and if the automobile is turning. When the steering wheel 1 is being turned but the automobile is not cornering, the step 110 checks the motor current signal Im. If the motor current signal Im is not present, the motor current command signal Imc is set to zero and at the step 112 the clutch disengaging mechanism 9 is activated to disconnect the motor 8 from the reduction mechanism 4.

If at step 110 the motor current signal Im is found to exist, the next step 111 generates the motor current command signal Imc according to the torsional torque signal τm. The program then returns to the step 107, repeating the above sequence of processing until it reaches the step 112 where the clutch disengaging mechanism 9 is operated.

The auxiliary steering power assist control means 132 performs a current control by the current control circuit 132f as explained above in the same way as does the main steering power assist control means 131. That is, the current control circuit 132f takes in an output of the D/A converter 132e as the motor current command signal Imc and the motor current detection signal Imf as a feedback current signal and thereby performs the current control to output the PWM signal through the pulse amplifier 133a and the selector circuit 133.

The above operating conditions may be summarized as shown in Table 2.

TABLE 2

| | 1 | 2 | 3 | 4 |
|---|---|---|---|---|
| Torque (τm) | Torque exists | No torque | Torque exists | No torque |
| Steering angle (θ) | None | Angle exists | Angle exists | None |
| State | Steering wheel being turned | No assist power | Cornering | No assist power |
| Result | Current control signal Imc continues to be generated | Clutch disengaged | Current control signal Imc is gradually lowered by timer | Clutch disengaged |

As stated above, the use of microcomputers in both the main steering power assist control means 131 and the auxiliary steering power assist control means 132 allows the two control systems to perform the same operation condition, so that the current control change can be made smoothly without interruption of the steering power assist operation. Thus, the driver feels no shock with the steering wheel 1 and will not notice when the steering assist power changing control is made.

Furthermore, since the microcomputer of the auxiliary steering power assist control means 132 needs only to produce the torsional torque signal τm as a current control signal the software processing required is only the protective operation triggered after the changing control is made from the main steering power assist control means 131 side, the auxiliary steering power assist control means 132 needs functions that are less complex than those of the main steering power assist control means 131 and also a small capacity memory (ROM) member. This only requires a small-scale microprocessor with simple circuit configurations.

The torsional torque signal τm value and the motor current control signal Imc value are compared and when there is a significant difference between the torsional torque signal τm value and the motor current command signal Imc value it is decided that one of the abnormal states has occurred.

Namely, when the mutual relationship between the torsional torque signal τm from the torque sensor 3 and the motor current command signal Imc in connection with the motor current signal Im is not present, the clutch disengaging mechanism 9 is disconnected from the motor 8.

Figure 7:
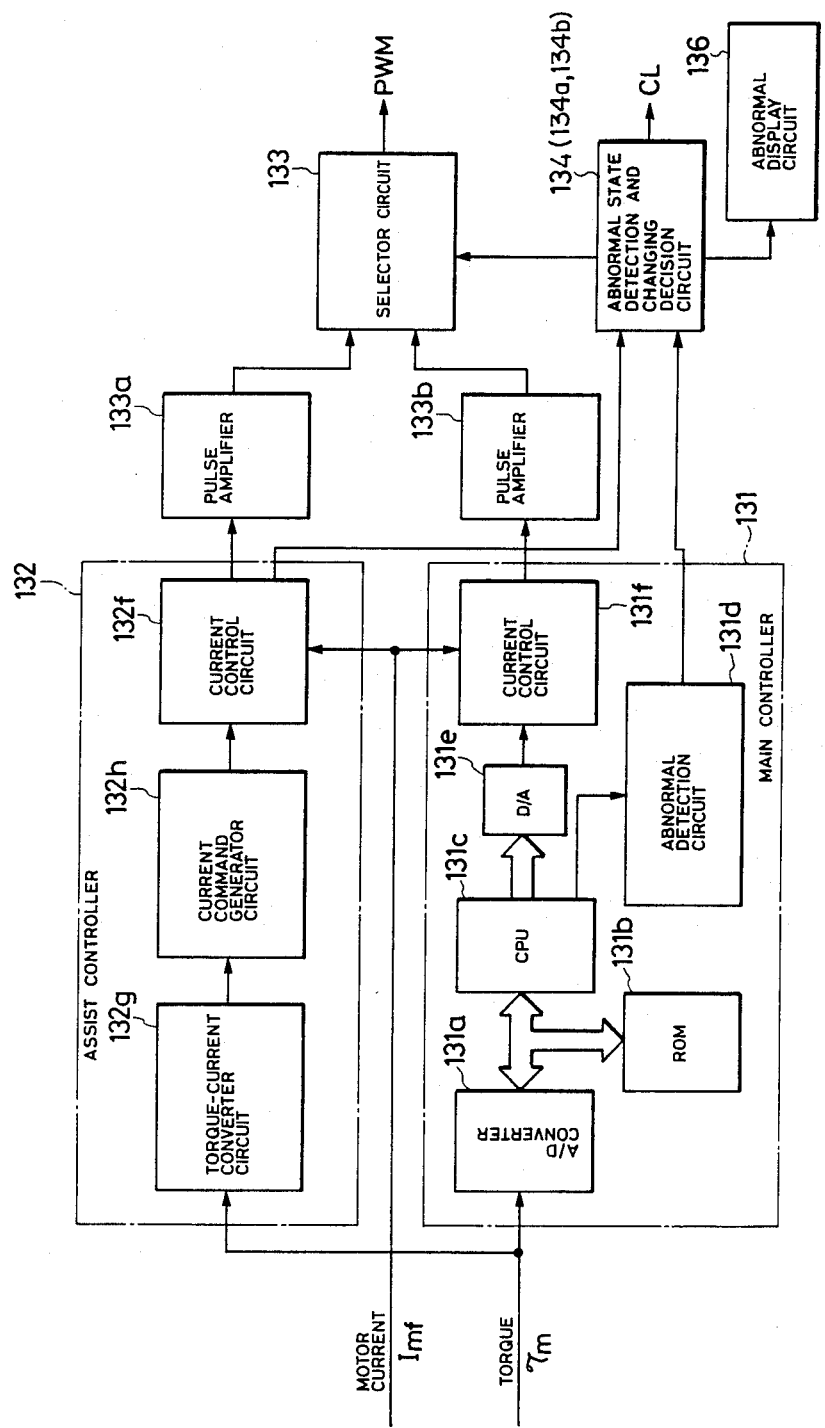
FIG. 7 is an electric circuitry according to another embodiment of the present invention.

Next will be explained the case where the main steering power assist control means is of microcomputer type and the auxiliary steering power assist control means is of analog type, by referring to FIG. 7. In FIG. 7, the element denoted 131 is the main steering power assist control means which has the same configuration as that of FIG. 3 and its explanation is omitted.

An auxiliary steering power assist control means 132 is of the analog type and includes a torque-current converter circuit 132g, a command current generator circuit 132h, and a current control circuit 132f which also has a function of detecting the motor current detection signal Imf. Other circuits are similar to those of FIG. 3.

The operation of the auxiliary steering power assist control means 132 is as follows. When the torsional torque signal τm is inputted to the torque-current converter circuit 132g, the torque-current converter circuit 132g converts it into a prescribed pattern which has a characteristic relationship according to the torsional torque signal τm. For example, the torsional torque signal τm is either positive or negative when the steering wheel 1 is turned to the left or right. The torque-current converter circuit 132g then converts them to only positive signals as required by the processing in the circuits.

Next, the command current generator circuit 132h performs such a processing as generating a signal in a certain relationship to an output of the torque-current converter circuit 132g, while making the maximum current limiter value of the auxiliary steering power assist control means 132 lower than that of the main steering power assist control means 131.

The current control circuit 132f performs the same operations as explained in FIG. 3. The current control circuit 132f also detects the zero motor current signal Im which is required when the current control is changed from the main steering power assist control means 131 side to the auxiliary steering power assist control means 132 side.

The changing of control from the main steering power assist control means 131 side to the auxiliary steering power assist control means 132 side, when the main steering power assist control means 131 fails, is carried out in the following sequence. When the main steering power assist control means 131 of the microcomputer type should fail during operation, the microprocessor abnormality detection circuit 131d produces an output which causes, through the abnormality detection and changing decision circuit 134, the selector circuit 133 to change from the main steering power assist control means 131 side to the auxiliary steering power assist control means 132 side to pick up the PWM signals and continue the steering power assist control.

At the same time, the abnormality display circuit 136 indicates the failure of the main steering power assist control means 131. Because the auxiliary steering power assist control means 132 is operating at all times, the changing of control upon the failure of the main steering power assist control means 131 can be carried out smoothly.

While the steering power assist control is performed by the auxiliary steering power assist control means 132, the current control circuit 132f detects the zero motor current signal Im. Or when the motor current detection signal Imf is below a prescribed value, the auxiliary steering power assist control means 132 produces a signal to the abnormality state detection and changing decision circuit 134.

The abnormality state detection and changing decision circuit 134 produces a signal to activate the clutch disengaging mechanism 9 when two conditions are satisfied-that the motor current signal Im is zero and that the main steering power assist control means 131 is abnormal. By the operation of the clutch disengaging mechanism 9 explained in FIG. 1, it is possible to protect against on abrupt change of the steering wheel power when the main steering power assist control means 131 fails, thereby increasing the safety of the automobile.

Figure 8:
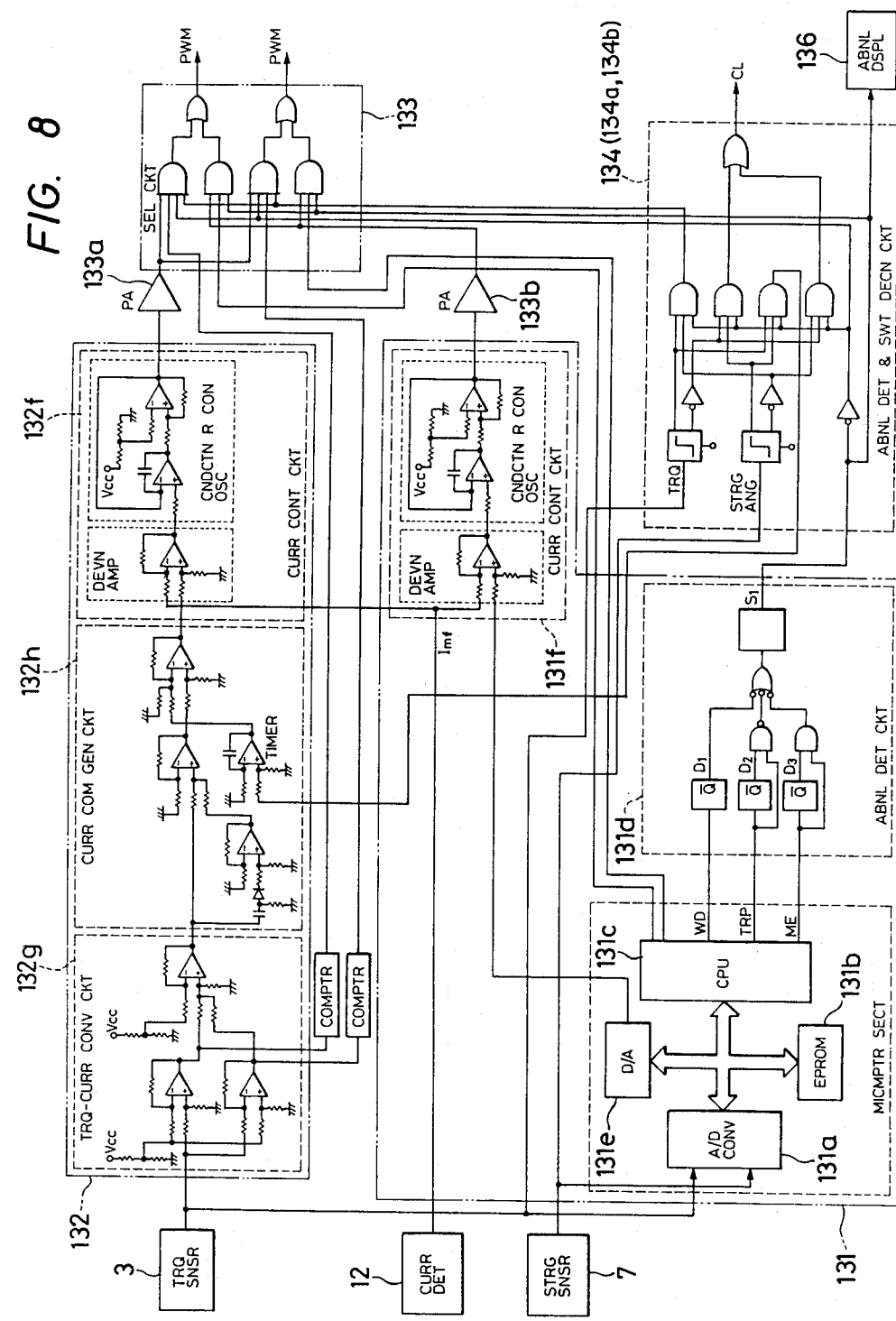
FIG. 8 is a detailed electric circuitry diagram according to another embodiment of the present invention.

FIG. 8 is a detailed diagram according to the above stated embodiment of the present invention. The main steering power assist control means 131 is of microcomputer type and comprises a microprocessor section, a current control circuit 131f, and a microcomputer abnormality detection circuit 131d. The microcomputer section includes an A/D converter 131a, a D/A converter 131e, a memory (EPROM) member 131b, and a central processing unit (CPU) 131c. The current control circuit 131f includes a deviation amplifier and a conduction ratio control oscillator.

The auxiliary steering power assist control means 132 is of analog type and comprises a torque-current converter circuit 132g, a command current generator circuit 132h, and a current control circuit 132f. The current control circuit 132f includes a deviation amplifier and a conduction ratio control oscillator.

A circuit 134 for detecting the abnormality state of the main steering power assist control means 131 and for making a decision on changing control is connected to the main steering power assist control means 131.

This microcomputer-analog combination type steering power assist means has the advantage of providing a simple analog electric circuit because the auxiliary steering power assist control means 132 generates the motor current command signal Imc on receiving only the torsional torque signal τm.

We claim:

1. In an electric motor-driven power steering apparatus comprising a steering wheel, a reduction mechanism, a steering mechanism, a motor for generating steering assist power, a clutch disengaging mechanism for disconnecting said motor from said reduction mechanism, a steering power assist control means for controlling steering assist power, and a motor drive means, in which said motor is controlled according to a torsional torque signal of said steering wheel or a steering angle signal of said steering wheel to provide the assist power of said motor for steering, characterized in that said steering power assist control means comprises first steering power assist control means and a second steering power assist control means, and a steering power assist change means is connected between said first steering power assist control means and said second steering power assist control means, so that when said first steering power assist control means fails while the steering power assist is being supplied, said steering power assist change means changes the steering power assist from said first steering power assist control means side to said second steering power assist control means side and steering assist power control is continued.

2. In an electric motor-driven power steering apparatus comprising a steering wheel, a reduction mechanism, a steering mechanism, a motor for generating steering assist power, a clutch disengaging mechanism for disconnecting said motor from said reduction mechanism, a steering power assist control means for controlling steering assist power, and a motor drive means, in which said motor is controlled according to a torsional torque signal of said steering wheel or a steering angle signal of said steering wheel to provide the assist power of said motor for steering, characterized in that said steering power assist control means comprises a first steering power assist control means and a second steering power assist control means being driven by said motor, said first steering power assist control means receives at least said torsional torque signal and a motor current command signal to control the steering power assist, said motor current command signal has a predetermined relationship with said torsional torque signal, said second steering power assist control means receives at least said torsional torque signal and said motor current command signal to control the steering power assist, and a steering power assist change means is connected between said first steering power assist control means and said second steering power assist control means, so that when said first steering power assist control means fails while the steering power assist is being supplied, said steering power assist change means changes the steering power assist from said first steering power assist control means side to said second steering power assist control means side and steering assist power control is continued.

3. In an electric motor-driven power steering apparatus comprising a steering wheel, a reduction mechanism, a steering mechanism, a motor for generating a steering assist power, a clutch disengaging mechanism for disconnecting said motor from said reduction mechanism, a steering power assist control means for controlling an assist power for steering, and a motor drive means, in which said motor is controlled according to torsional torque signal of said steering wheel or a steering angle signal of said steering wheel to provide the assist power of said motor for steering, characterized in that said steering power assist control means comprises a first steering power assist control means and a second steering power assist control means, said first steering power assist control means receives at least said torsional torque signal to control the steering power assist and outputs a motor current command signal, said motor current command signal has a predetermined relationship with said torsional torque signal, said second steering power assist control means receives at least said torsional torque signal to control the steering power assist and outputs said motor current command signal, an abnormality state detection means is connected to said first steering power assist control means and detects a state of said first steering power assist control means, a changing decision means is connected to said abnormality state detection means and produces a signal for changing the steering power assist control from said first steering power assist control means to said second steering power control means, so that when said first steering power assist control means is abnormal, said changing decision means produces a signal for changing the steering power assist control from said first steering power assist control means to said second steering power assist control means, and a steering power assist change means is connected between said first steering power assist control means and said second steering power assist control means, so that when said first steering power assist control means fails while the steering power assist is being supplied, said steering power assist change means changes the steering power assist from said first steering power assist control means to said second steering power assist control means in accordance with said changing signal from said changing decision means and steering assist power control is continued.

4. An electric motor-driven power steering apparatus according to claim 3, characterized in that said changing decision means controls a selector means, said selector means is connected between said first steering power assist control means and said second steering power assist control means.

5. An electric motor-driven power steering apparatus according to claim 3, characterized in that an abnormality state display means is connected to said abnormality state detection means so as to display an abnormality state of said first steering power assist control means.

6. An electric motor-driven power steering apparatus according to claim 3, characterized in that said first steering power assist control means is of microcomputer type, and said second steering power assist control means is of microcomputer type.

7. An electric motor-driven power steering apparatus according to claim 6, characterized in that said first steering power assist control means comprises a central processing unit, a microprocessor abnormality detection means, and a current control means, and said second steering power assist control means comprises a central processing unit, a microprocessor abnormality detection means, and a current control means.

8. An electric motor-driven power steering apparatus according to claim 3, characterized in that said first steering power assist control means is a microcomputer control means, and said second steering power assist control means is an analog control means.

9. An electric motor-driven power steering apparatus according to claim 8, characterized in that said first steering power assist control means comprises a central processing unit, a microprocessor abnormality detection means, and a current control means, and said second steering power assist control means comprises a torque-current converter means, a command current generator means, and a current control means.

10. In an electric motor-driven power steering apparatus for use in a vehicle comprising a steering wheel, a reduction mechanism, a steering mechanism, tires being turned by said steering mechanism, a motor for generating a steering assist power, a clutch disengaging mechanism for disconnecting said motor from said reduction mechanism, a steering power assist control means for occurring an assist power for steering, and a motor drive means, in which said motor is controlled according to a torsional torque signal of said steering wheel to provide the assist power of said motor for steering, characterized in that said steering power assist control means comprises a main steering power assist control means and an auxiliary steering power control means, said main steering power assist control means receives at least said torsional torque signal to control the steering assist power and outputs a motor current command signal, said motor current command signal has a predetermined relationship with said torsional torque signal, said auxiliary steering power assist control means receives at least said torsional torque signal to control the steering power assist and outputs said motor current command signal, an abnormality state detection means is connected to said main steering power assist control means and detects a state of said main steering power assist control means and a steering state of the vehicle, a changing decision means is connected to said abnormality state detection means and produces a signal for changing the steering power assist control from said main steering power assist control means to said auxiliary steering power assist control means, so that when said main steering power assist control means is abnormal, said changing decision means produces a signal for changing the steering power assist control from said main steering power assist control means to said auxiliary steering power assist control means, a selector means is connected to said changing decision means and is operated by said changing decision means in such a way that said motor drive means is controlled by said auxiliary steering power assist control means when said main steering power assist control means fails while the steering power assist is being applied, and a clutch disengaging mechanism drive means is connected to said selector means and operates said clutch disengaging mechanism to disconnect a driving power of said motor when said steering wheel is not being turned and the steering power assist is zero.

11. An electric motor-driven power steering apparatus for use in a vehicle according to claim 10, characterized in that an abnormality state display means is connected to said abnormality state detection means and is activated in response to the operation of said abnormality state detection means.

12. An electric motor-driven power steering apparatus for use in a vehicle according to claim 10, characterized in that said changing decision means has a function to gradually lower said motor current command signal when said steering wheel is being turned and the vehicle is making a turn, and then to activate said clutch disengaging mechanism drive means when said steering wheel is not being turned.

13. An electric motor-driven power steering apparatus for use in a vehicle according to claim 10, characterized in that said torsional torque signal value and said motor current command signal value are compared and when there is a significant difference between said torsional torque signal value and said motor current command signal value it is decided that an abnormal state has occurred.

14. An electric motor-driven steering apparatus for use in a vehicle according to claim 10, characterized in that said main steering power assist control means is a microcomputer control means, and said auxiliary steering power assist control means is a microcomputer control means.

15. An electric motor-driven power steering apparatus for use in a vehicle according to claim 14, characterized in that said main steering power assist control means comprises a central processing unit, a microprocessor abnormality detection means, and a current control means, and said auxiliary steering power assist control means comprises a central processing unit, a microprocessor abnormality detection means, and a current control means.

16. An electric motor-driven power steering apparatus for use in a vehicle according to claim 10, characterized in that said main steering power assist control means is a microcomputer control means, and said auxiliary steering power assist control means is an analog control means.

17. An electric motor-driven power steering apparatus for use in a vehicle according to claim 16, characterized in that said main steering power assist control means comprises a central processing unit, a microprocessor abnormality detection means, and a current control means, and said auxiliary steering power assist control means comprises a torque-current converter means, a command current generator means, and a current control means.

* * * * *